United States Patent
Slack

(10) Patent No.: US 9,810,899 B1
(45) Date of Patent: Nov. 7, 2017

(54) ILLUMINATION OF AN ELECTROWETTING DISPLAY

(71) Applicant: Amazon Technologies, Inc., Seattle, WA (US)

(72) Inventor: Anthony John Slack, Var (FR)

(73) Assignee: Amazon Technologies, Inc., Seattle, WA (US)

( * ) Notice: Subject to any disclaimer, the term of this patent is extended or adjusted under 35 U.S.C. 154(b) by 311 days.

(21) Appl. No.: 14/581,699

(22) Filed: Dec. 23, 2014

(51) Int. Cl.
| | |
|---|---|
| *G09G 3/14* | (2006.01) |
| *G09G 3/20* | (2006.01) |
| *G09G 3/34* | (2006.01) |
| *G02B 26/00* | (2006.01) |
| *F21V 8/00* | (2006.01) |
| *G02F 1/167* | (2006.01) |
| *G02F 1/1335* | (2006.01) |
| *G09G 3/3233* | (2016.01) |

(52) U.S. Cl.
CPC ......... *G02B 26/005* (2013.01); *G02B 6/0068* (2013.01); *G02B 6/0073* (2013.01); *G02B 6/0026* (2013.01); *G02F 1/1336* (2013.01); *G02F 1/133514* (2013.01); *G02F 1/133602* (2013.01); *G02F 1/133606* (2013.01); *G02F 1/167* (2013.01); *G02F 2001/133622* (2013.01); *G02F 2203/34* (2013.01); *G09G 3/2003* (2013.01); *G09G 3/3233* (2013.01); *G09G 3/348* (2013.01); *G09G 3/3433* (2013.01); *G09G 2300/04* (2013.01); *G09G 2300/0452* (2013.01)

(58) Field of Classification Search
CPC ............... G02F 1/167; G02F 1/133603; G02F 1/133606; G02F 1/1336; G02F 1/133602; G02F 1/133514; G02F 2001/133622; G02F 2203/34; G09G 3/2003; G09G 3/3233; G09G 2300/0452; G09G 2300/04; G09G 3/3433; G09G 3/348; G02B 6/0073; G02B 26/005; G02B 6/0068; G02B 6/0026
USPC ................ 359/290–292, 295, 296, 298, 316; 345/32, 39, 48, 55, 71, 72, 80, 82, 83, 84, 345/102, 103, 108; 348/335; 362/97.1, 362/227, 800, 600, 601, 610–612
See application file for complete search history.

(56) References Cited

U.S. PATENT DOCUMENTS

2012/0262774 A1* 10/2012 Bae ..................... G02B 26/005
359/290

* cited by examiner

*Primary Examiner* — Evelyn A Lester
(74) *Attorney, Agent, or Firm* — Lee & Hayes, PLLC

(57) ABSTRACT

Subject matter disclosed herein relates to arrangements and techniques that provide for using a wavelength specific illumination for illuminating a display, for example an electrowetting display. The electrowetting display comprises a first substrate and a second substrate. A plurality of pixel regions is provided between the first substrate and the second substrate. The electrowetting display further comprises a first fluid within the pixel regions and on the first substrate. The first fluid comprises one or more dyes and a second fluid is disposed on the first fluid. The second fluid is substantially immiscible with the first fluid. An illumination layer is included between the first substrate and the second substrate. The illumination layer comprises one or more LEDs and at least one of the LEDs produces light at a specific wavelength corresponding to a wavelength of absorption of one of the one or more dyes.

22 Claims, 5 Drawing Sheets

ILLUMINATION OF AN ELECTROWETTING DISPLAY

BACKGROUND

Most portable electronic devices include displays for displaying various types of images. Examples of such displays include electrowetting displays (EWDs), liquid crystal displays (LCDs), electrophoretic displays (EPDs), light emitting diode displays (LED displays), etc. Electrowetting displays include oil that covers a pixel (or sub-pixel) region of the display when the display is in an off-state. In an on-state, the oil is retracted and thus, does not cover the pixel region. To switch the pixel region into the on-state, a voltage is applied across the oil via an electrically conductive fluid that is substantially immiscible with the oil. To switch the pixel region into the off-state, the voltage is switched off and the oil once again covers the pixel region. Light, either from a backlight source or a frontlight source, is generally passed through the pixel regions in order to illuminate the electrowetting display. In various embodiments, the oil is black, i.e. appears black to an observer and thus, when a pixel region is in the on-state, the light passes through the pixel region and thus, the pixel region provides a white pixel (or sub-pixel). Alternatively, a color filter may be provided with the pixel region and thus, the light during the on-state would be colored based upon the color of the color filter. Alternatively, when the pixel region is in the off-state, light may pass through the oil, which may be colored, and thus, the pixel region may produce a colored pixel (or sub-pixel) based upon the color of the oil. If the oil is black, then during the off-state, the pixel region will produce a black pixel (or sub-pixel).

The oil is given a black appearance using a mixture of multiple colored dyes. Likewise, the oil may be colored a single color by providing a single colored dye within the oil. The color of the dyes may however fade over a period of time due to prolonged exposure of the dyes to components of the light produced by the backlight source or the frontlight source within a spectrum of short wavelengths, i.e. high energy wavelengths, and/or the ultraviolet light spectrum. This is often referred to as photo-bleaching, which may affect the lifetime of the display.

BRIEF DESCRIPTION OF THE DRAWINGS

The detailed description is described with reference to non-limiting and non-exhaustive embodiments illustrated in the accompanying figures. The same reference numerals in different figures refer to similar or identical items.

DETAILED DESCRIPTION

Figure 1A:
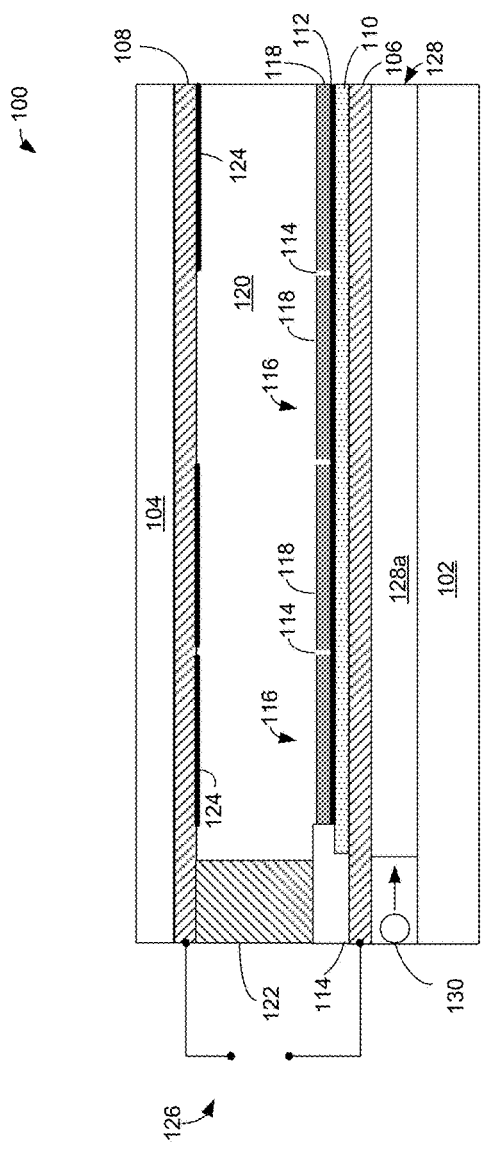
FIGS. 1A and 1B are schematic views of examples of electrowetting displays that include one or more wavelength specific light sources, according to various embodiments.

The present disclosure provides arrangements and techniques that provide for using a wavelength specific illumination for illuminating a display, for example an electrowetting display. The wavelength specific illumination can help minimize degradation of dyes within fluid of the electrowetting display, and improve the lifetime of the display.

In general, image display apparatuses, such as, for example, various portable electronic devices, including, but not limited to, portable computing devices, tablet computers, laptop computers, notebook computers, mobile phones, personal digital assistants (PDAs), and portable media devices (e.g., e-book devices, DVD players, etc.), display images on a display. Examples of such displays include, but are not limited to, LCDs, EWDs and EPDs.

More particularly, a display, such as an electrowetting display, for example, can be a thin film transistor electrowetting display (TFT-EWD) that generally includes an array of transmissive, reflective and/or transflective pixels or sub-pixels (referred to herein as sub-pixels) configured to be operated by an active matrix addressing scheme (although in embodiments, an electrowetting display can also be a passive display). For example, rows and columns of sub-pixels are operated by controlling voltage levels on a plurality of source lines and gate lines. In this fashion, the display can produce an image by selecting particular sub-pixels to transmit, reflect or block light. Sub-pixels are addressed (e.g., selected) via rows and columns of the source lines and gate lines that are connected to transistors (e.g., used as switches) included in each sub-pixel. Transistors take up a relatively small fraction of the area of each sub-pixel. For example, the transistor can be located underneath the reflector in reflective displays.

Electrically, each sub-pixel is a small capacitor with a layer of insulating optical material (e.g., liquid crystal material or electrowetting material) sandwiched between two substrates, wherein each substrate generally includes a transparent conductive indium tin oxide (ITO) layer. A one-way current-passing characteristic of the transistor of the sub-pixel prevents charge that is being applied to the sub-pixel from draining between refresh cycles of the display's image.

An electrowetting display employs an applied voltage to change the surface tension of a fluid in relation to a surface. For instance, by applying a voltage to a hydrophobic surface via a pixel electrode in conjunction with a common electrode, the wetting properties of the surface can be modified so that a second fluid has a greater affinity for the surface. Hydrophobic generally refers to repelling polar fluids while hydrophilic generally refers to having an affinity for polar fluids. As one example of an electrowetting display, the modification of the surface energy of the hydrophobic surface by applying a voltage causes the electrolyte, considered to be the second fluid, in an electrowetting fluid in individual sub-pixels of the display to adjoin the modified hydrophobic surface and thus, displace an oil layer in individual sub-pixels of the display. In accordance with various embodiments, the oil may be colored using a colored dye. In accordance with other embodiments, color filters may be included with each sub-pixel. The oil layer is generally made up of an oil that is electrically non-conductive and may for instance be an alkane like hexadecane or silicone oil. Thus, the electrowetting fluids in the individual sub-pixels of the display responding to the change in surface tension act as an optical switch.

When the voltage is absent, the oil forms a continuous film within a sub-pixel, and a color may thus be visible to a user of the display, via the oil being colored. Additionally, the sub-pixels may provide a black pixel (for either a black and white display or a color display) through the combination of colors of sub-pixels. The oil may also be black (based upon a mixture of colored dyes or just a black dye) and thus, the sub-pixels may also produce black when the voltage is absent. Additionally, the sub-pixels may provide a black pixel (for either a black and white display or a color display) through the combination of black sub-pixels.

On the other hand, when the voltage is applied to the sub-pixel, the oil is displaced and the sub-pixel becomes transparent, thus providing a light (i.e. less dark) or white sub-pixel, or a light (i.e. less dark) or white pixel (for either a black and white display or a color display) through the combination of sub-pixels. The sub-pixels may also provide colors via light provided by a backlight source or a frontlight source that passes through color filters within the sub-pixels. The sub-pixels may provide a black pixel (for either a black and white display or a color display) through the combination of colors of the sub-pixels.

When multiple sub-pixels of the display are independently activated, the display can present a color or grayscale image. The sub-pixels may form the basis for a transmissive, reflective, or transmissive/reflective (transreflective) display. Further, the sub-pixels may be responsive to high switching speeds (e.g., on the order of several milliseconds), while employing small sub-pixel dimensions. Accordingly, the electrowetting displays herein may be suitable for applications such as displaying video and/or static content. In addition, the low power consumption of electrowetting displays in general makes the technology suitable for displaying content on portable displays that rely on battery power.

As previously noted, an electrowetting display generally uses backlights and frontlights, which are often referred to as light-guides, to illuminate the electrowetting display. The backlights and frontlights are generally composed of white light emitting diodes (LEDs) that generate white light by using phosphors within the white LED to convert light produced by the LED semiconductors. As is known, white light generated by the white LEDs has a mix of wavelengths from the blue end of the light spectrum to the red end of the light spectrum. The higher energy blue wavelength range (approximately 400 nanometers (nm)) and the shorter wavelength ultraviolet (UV) range (also produced by the white LEDs as well as by ambient light) can disproportionately impair the quality of the dyes in the oil used in electrowetting displays. Other wavelengths within the white light may also cause impairment of the dyes. Damage may be due to some breakdown of the molecular structure of the dye compounds upon exposure to mostly blue/UV light wavelengths, which may reduce the lifetime of the dyes and therefore of the electrowetting display.

In accordance with various embodiments, the electrowetting display includes either a backlight source or a frontlight source for illuminating the electrowetting display that comprise Red Green Blue (RGB) light emitting diodes (LEDs). In accordance with certain embodiments, the LEDs may be Cyan Magenta Yellow (CMY) LEDs. The RGB LEDs are designed generally to emit wavelengths that are specifically tuned to match the particular wavelengths of corresponding dyes, or particular ranges of wavelengths of corresponding dyes, of the dyes within the oil. For example, if the oil is black and thus, made up of red, blue and green dyes, then the corresponding RGB LEDs are tuned to specific wavelengths that correspond to the wavelengths of the red dye, the green dye and the blue dye. Likewise, if CMY LEDs are used, then the wavelengths of the corresponding CMY LEDs may be tuned to correspond to the wavelengths of the red dye, the green dye, and the blue dye. However, CMY LEDs generally produce light having wavelengths that are longer, i.e. low energy, and thus may not be damaging to the red dye, the green dye and the blue dye such that the CMY LEDs may not require any tuning to specific wavelengths.

FIG. 1A schematically illustrates a cross-sectional view of a portion of an electrowetting display 100. The electrowetting display 100 generally includes a first (or bottom) substrate 102 and a second (or top) substrate 104. In general, the substrates 102, 104 may be glass, but other rigid or flexible materials may be used. The electrowetting display 100 further includes a first electrode 106, often referred to as a pixel electrode, and a second electrode 108, often referred to as a common electrode. A barrier or insulating layer 110 is provided on the electrode 106. The insulating layer 110 generally includes a hydrophobic coating 112. In embodiments however, the insulating layer is optional and may comprise a hydrophobic material and thus, may be a hydrophobic layer 110. In embodiments, the insulating layer 110 may be a dielectric barrier layer that may act as a barrier that prevents electrolyte components (e.g., an electrolyte solution) from reaching the first electrode 106. Otherwise, for example, electrochemical reactions (e.g., electrolysis) between the electrolyte components and the first electrode 106 may occur. Such a dielectric barrier layer 110 may include the hydrophobic coating 112 and may comprise a silicon dioxide layer (e.g., about 0.2 microns thick) and a polyimide layer (e.g., about 0.1 micron thick), though claimed subject matter is not so limited. Generally, the first electrode 106, the insulating layer 110 and hydrophobic coating 112 are transparent. Pixel walls 114 are provided to divide the electrowetting display 100 into pixel regions 116. Each pixel region 116 may be a pixel or a sub-pixel depending upon the configuration of the electrowetting display 100.

A non-conductive or non-polar fluid, such as an oil 118, often referred to as an electrowetting oil, that may be black or some other color, is provided on the hydrophobic coating 112. A conductive or polar fluid 120 that generally includes an electrolyte is provided over the oil 118. The oil 118 and the conductive fluid 120 are substantially immiscible with each other. The oil 118 may be colored or may be black. In embodiments where the oil 118 is black, a mixture of colored dyes may be added to the oil 118 to create a black appearance to an observer. In an embodiment, a red dye, a yellow dye and a blue dye may be added to the oil 118 to create the black appearance. In other embodiments, a red dye, a green dye and a blue dye may be added to the oil 118 to create the black appearance.

A seal 122 is provided at the ends of the electrowetting display 100 to help seal the display and maintain the oil 118 and the conductive fluid 120 within the electrowetting display 100. Only one seal 122 is illustrated in FIG. 1A for clarity. A color filter 124 is generally included so that the electrowetting display 100 can produce various forms of color. The color filter 124 may be an RGBW filter or an RGB filter depending upon the application. A voltage source 126 is provided to provide power to the electrodes 106, 108 for operation of the electrowetting display 100 to thereby generate an electric field between the electrodes 106, 108.

In accordance with various embodiments, an illumination layer 128 is provided. In the example embodiment of FIG. 1A, the illumination layer 128 is located adjacent to the first (or bottom) substrate 102 and generally includes one or more light sources 130. Thus, in such an embodiment, the illumination layer 128 is a backlight source. The light sources 130 are generally in the form of light emitting diodes (LEDs). However, other light sources may be used if desired. For example, fluorescent tubes may be used.

In some implementations, the light sources 130 may be connected to a flexible printed circuit (FPC) (not illustrated) to control the amount and/or distribution of light generated. In the case of one or more LEDs being the light source 130, the LEDs may be selected to emit light in a color spectrum that is based upon the color spectrums of the dyes in the oil 118. For instance, multiple different color-temperature LEDs may be selected to substantially match the color spectrums of the dyes in the oil 118. Additionally, electronic displays typically use a light source to shine light onto a display to improve visibility of content on the display. For example, many electronic devices use backlights that light up a display to enable a viewer to see content on the display that would otherwise be difficult to see without the backlights. In another example, reflective displays can use frontlights to improve visibility of content on displays, particularly in low light situations. A backlight illumination layer 128 of the electrowetting display 100 typically includes a light guide film 128a. The light guide film 128a carries light along its length using total internal reflection. Additionally, a portion of this light may be outcoupled instead of being totally internally reflected. The outcoupled light may provide (back) illumination to pixel regions 116. Physical dimensions of the light guide film 128a can be described by length, width and thickness, and terms "length," "width" and "thickness" are relative terms. Generally, the length and width are much greater than the thickness. A size (e.g., height or width) of a light source 130 is typically an order of magnitude greater than the thickness of the light guide film 128a. As an example, the light source 130 may emit light from an area of more than about one square millimeter while a thickness of the light guide film 128a may be less than about 0.5 millimeters. Thus, the light source 130 can be substantially larger than a height of an edge or end-face of a light guide film. Moreover, the light source 130 typically emits light over a relatively large angular range. Angular distribution of light emitted by an LED can include a cone that subtends a relatively wide angle (e.g., about 30 degrees, in one example implementation). Thus, the example embodiment illustrated in FIG. 1A is schematic and the sizes of components illustrated in FIG. 1A are generally not to scale.

In accordance with an embodiment, the light sources include RGB LEDs in the form of one or more red LEDs that produce red light within the red light wavelength spectrum (e.g., approximately 625 nm to 675 nm), one or more green LEDs that produce green light within the green wavelength spectrum (e.g., approximately 485 nm to 535 nm), and one or more blue LEDs that produce blue light within the blue wavelength spectrum (e.g., approximately 425 nm to 475 nm). Thus, a combination of each of the three LEDs can produce a white light, i.e. a red LED, a green LED and a blue LED are arranged such that they can produce a gamut of colors including white light. In accordance with various embodiments, the illumination layer 128 includes multiple combinations of red LEDs, green LEDs and blue LEDs, where each combination comprises a corresponding red LED, a corresponding green LED and a corresponding blue LED.

In accordance with embodiments, each LED is specifically tuned to produce a corresponding light within a wavelength of a colored dye present within the oil 118. More particularly, each LED may be tuned for a range or spectrum of light emission that corresponds to a range or spectrum of light absorption within a corresponding colored dye in the oil 118. Thus, each red LED produces red light within a wavelength, or range of wavelengths, of red dye in the oil 118, the blue LED produces light within a wavelength, or range of wavelengths, of blue dye in the oil 118, and the green LED produces light within a green wavelength spectrum. If a green dye is utilized to create black oil, then the green LED light is tuned to have a wavelength, or range of wavelengths, that corresponds to the wavelength, or range of wavelengths, of the green dye in the oil 118.

In accordance with other embodiments, the light source 130 comprises cyan magenta yellow (CMY) LEDs and thus, one or more cyan LEDs, one or more magenta LEDs and one or more yellow LEDs. Cyan generally has a wavelength spectrum of approximately 500 nm to 520 nm, while magenta is generally a combination of blue and red, i.e. approximately 425 nm to 475 nm (blue) and approximately 625 nm to 675 nm. Yellow generally has a wavelength of approximately 545 nm to 595 nm. The cyan, magenta and yellow LEDs generally do not need to have the wavelengths of light produced adjusted as the wavelengths of the light produced by the cyan LEDs, the magenta LEDs and the yellow LEDs may not degrade any of the red dye, the green (or yellow) dye, and the blue dye. The yellow LED can be tuned to a wavelength that corresponds to the wavelength of any yellow dye used within the black oil 118, if desired. As the yellow wavelength spectrum is close to the green wavelength spectrum, the yellow LED can be tuned to a wavelength close to a wavelength of any green dye within the oil 118, if desired. Alternatively, the oil 118 may be given a black appearance with a combination of cyan dye, magenta dye and yellow dye. A purple dye may also be used in addition to or in place of the cyan dye, magenta dye and the yellow dye. The cyan LEDs, magenta LEDs and yellow LEDs are then tuned to respective wavelengths that correspond to wavelengths of the respective cyan dye, magenta dye (which may be a combination of blue dye and red dye) and yellow dye. A combination of each of the three LEDs can produce a white light, i.e. a cyan LED, a magenta LED and a yellow LED are arranged such that they can produce a gamut of colors including white light. In accordance with various embodiments, the illumination layer 128 includes multiple combinations of cyan LEDs, magenta LEDs and yellow LEDs, where each combination comprises a corresponding cyan LED, a corresponding magenta LED and a corresponding yellow LED.

Figure 1B:
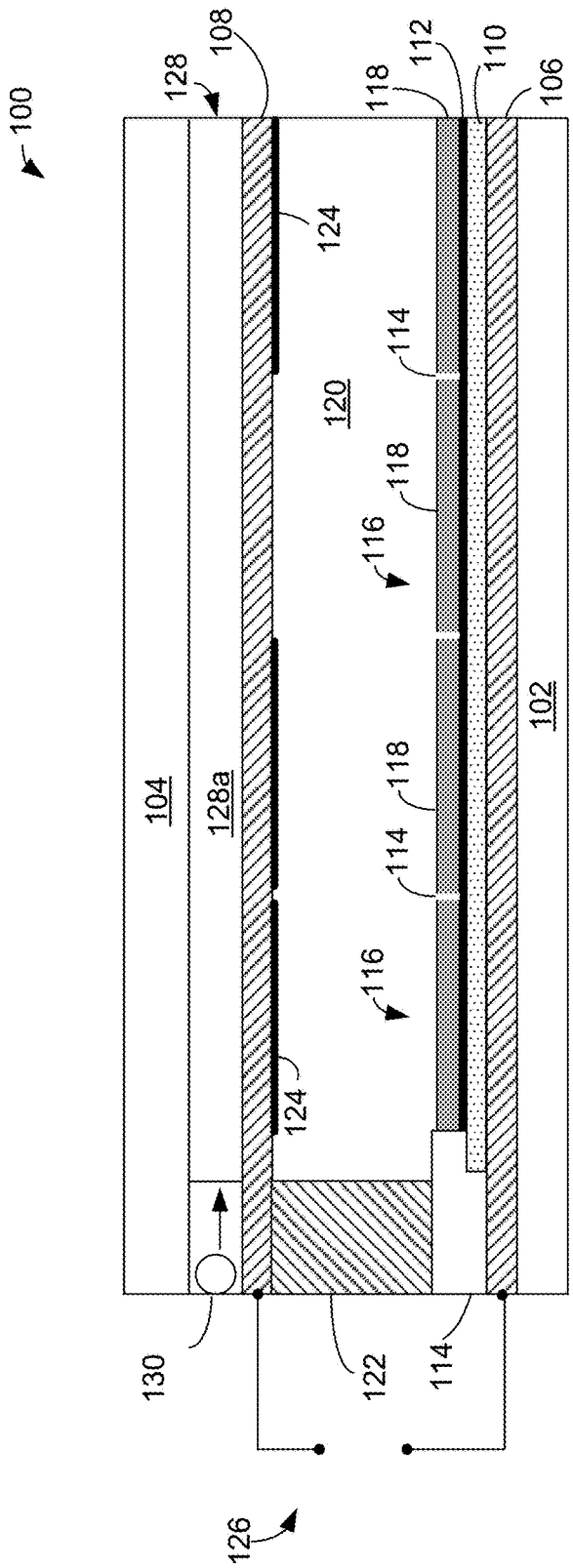

FIG. 1B illustrates another embodiment of the electrowetting display 100. In the example embodiment of FIG. 1B, the illumination layer 128 is located adjacent to the second (or top) substrate 102 and generally includes one or more light sources 130. Thus, in such an embodiment, the illumination layer 128 is a frontlight source. As with the embodiment of FIG. 1A, the light sources 130 are generally in the form of light emitting diodes (LEDs). However, other light sources may be used if desired. For example, organic light emitting diodes (OLEDs), lasers, fluorescent tubes, etc., may be used.

As previously noted, in some implementations, the light sources 130 may be connected to a flexible printed circuit (FPC) (not illustrated) to control the amount and/or distribution of light generated. In the case of one or more LEDs being the light source 130, the LEDs may be selected to emit light in a color spectrum that is based upon the color spectrums of the dyes in the oil 118. For instance, multiple different color-temperature LEDs may be selected to substantially match the color spectrums of the dyes in the oil 118. In the example embodiment of FIG. 1B, the electrowetting display 100 is a reflective display utilizing frontlight illumination layer 128, which includes a light guide film 128a. The light guide film 128a carries light along its length using total internal reflection. Additionally, a portion of this light may be outcoupled instead of being totally internally reflected. The outcoupled light may provide (front) illumination to pixel regions 116. Physical dimensions of the light guide film 128a can be described by length, width and thickness, and terms "length," "width" and "thickness" are relative terms. Generally, the length and width are much greater than the thickness. A size (e.g., height or width) of a light source 130 is typically an order of magnitude greater than the thickness of the light guide film 128a. As an example, the light source 130 may emit light from an area of more than about one square millimeter while a thickness of the light guide film 128a may be less than about 0.5 millimeters. Thus, the light source 130 can be substantially larger than a height of an edge or end-face of a light guide film. Moreover, the light source 130 typically emits light over a relatively large angular range. Angular distribution of light emitted by an LED can include a cone that subtends a relatively wide angle (e.g., about 30 degrees, in one example implementation). Thus, the example embodiment illustrated in FIG. 1B is schematic and the sizes of components illustrated in FIG. 1B are generally not to scale.

In accordance with an embodiment, the light sources include one or more red LEDs that produce red light within the red light wavelength spectrum, one or more green LEDs that produce green light within the green wavelength spectrum, and one or more blue LEDs that produce blue light within the blue wavelength spectrum. Thus, a combination of each of the three LEDs can produce a white light, i.e. a red LED, a green LED and a blue LED are arranged such that they can produce a gamut of colors including white light. In accordance with various embodiments, the illumination layer 128 includes multiple combinations of red LEDs, green LEDs and blue LEDs, where each combination comprises a corresponding red LED, a corresponding green LED and a corresponding blue LED.

In accordance with embodiments, each LED is specifically tuned to produce a corresponding light within a wavelength of a dye present within the oil 118. More particularly, each LED may be tuned for a range or spectrum of light emission that corresponds to a range or spectrum of light absorption within a corresponding colored dye in the oil 118. Thus, each red LED produces red light within a wavelength, or a range of wavelengths, of red dye in the oil 118, the blue LED produces light within a wavelength, or range of wavelengths, of blue dye in the oil 118, and the green LED produces light within a green wavelength spectrum. If a green dye is utilized to create black oil, then the green LED light is tuned to have a wavelength, or a range of wavelengths, that corresponds to the wavelength, or a range of wavelengths, of the green dye in the oil 118.

In accordance with other embodiments, the light source 130 comprises CMY LEDs and thus, one or more cyan LEDs, one or more magenta LEDs and one or more yellow LEDs. The cyan, magenta and yellow LEDs generally do not need to have the wavelengths of light produced adjusted as the wavelengths of the light produced by the cyan LEDs, the magenta LEDs and yellow LEDs may not degrade any of the red dye, the green (or yellow) dye, and the blue dye. The yellow LED can be tuned to a wavelength that corresponds to the wavelength of any yellow dye used within the black oil 118, if desired. As the yellow wavelength spectrum is close to the green wavelength spectrum, the yellow LED can be tuned to a wavelength close to a wavelength of any green dye within the oil 118, if desired. Alternatively, the oil 118 may appear black based upon a combination of cyan dye, magenta dye and yellow dye. A purple dye may also be used in addition to or in place of the cyan dye, magenta dye and the yellow dye. The cyan LEDs, magenta LEDs and yellow LEDs are then tuned to respective wavelengths that correspond to wavelengths of the respective cyan dye, magenta dye and yellow dye. A combination of each of the three LEDs can produce a white light, i.e. a cyan LED, a magenta LED and a yellow LED are arranged such that they can produce a gamut of colors including white light. In accordance with various embodiments, the illumination layer 128 includes multiple combinations of cyan LEDs, magenta LEDs and yellow LEDs, where each combination comprises a corresponding cyan LED, a corresponding magenta LED and a corresponding yellow LED.

Accordingly, the LEDs used as the light sources 130 emit wavelengths specifically tuned to match the wavelengths of dyes in the oil 118. Because of the use of specific wavelengths to illuminate the electrowetting display 100, photo-degradation of the dye molecules in the oil 118 may be reduced. In combination, the wavelength specific LEDs are still capable of generating a full gamut of light, including white light. Generally, LEDs can be designed to emit light of various or particular wavelengths.

Thus, by using wavelength specific LEDs, the UV light component may be eliminated from light produced by the light sources 130 to illuminate the electrowetting display, as well as visible parts of the light spectrum that may also degrade the dye molecules, e.g., the shorter, high energy wavelengths such as the blue light wavelength spectrum. Due to the wavelengths of the light spectrum produced by CMY LEDs, use of CMY LEDs for the light sources 130 may also eliminate the UV light component from light produced by the light sources 130 to illuminate the electrowetting display 100, as well as the visible parts of the light spectrum that may also degrade the dye molecules, e.g., the shorter, high energy wavelengths such as the blue light wavelength spectrum, since the CMY LEDs generally do not produce the shorter, high energy wavelengths (including UV wavelengths).

Figure 2:
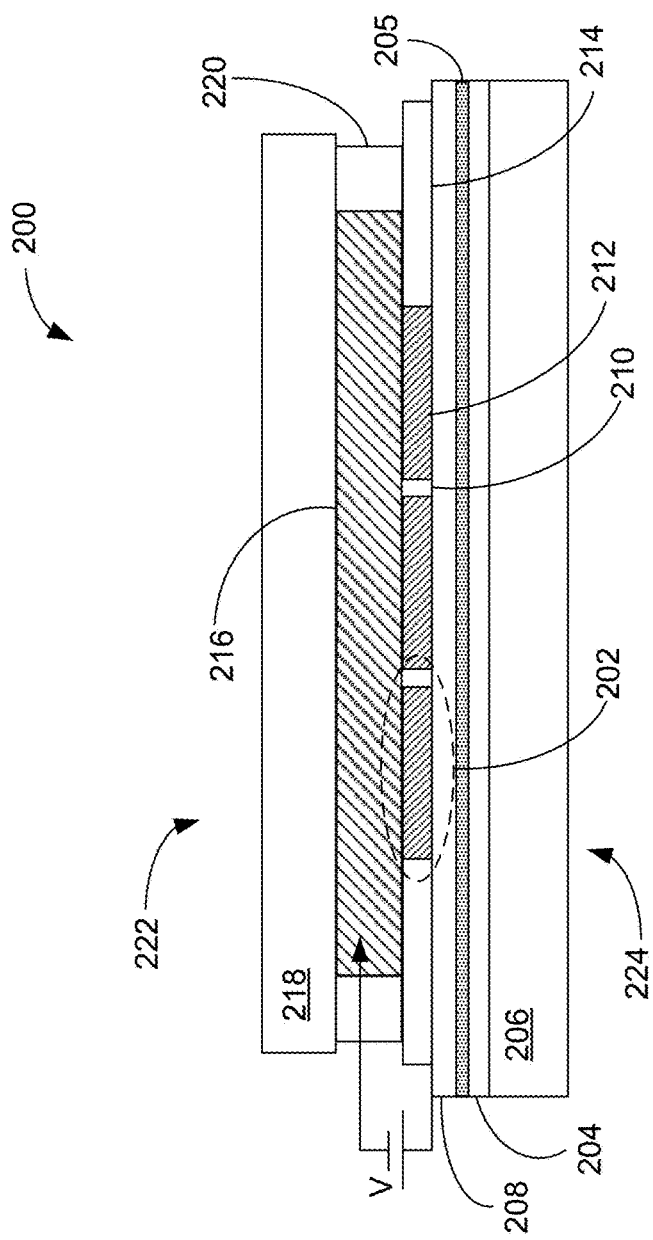
FIG. 2 is a cross-section of an example of a portion of an electrowetting display at least similar to the examples of the electrowetting display illustrated in FIGS. 1A and 1B, according to various embodiments.

FIG. 2 is a cross-section of a portion of an example of an electrowetting display 200 (similar to the electrowetting display 100 of FIGS. 1A and 1B) that schematically illustrates several electrowetting elements 202 that generally correspond to pixel regions 116 of FIGS. 1A and 1B, according to some embodiments. An electrode layer 204 that includes the pixel electrodes 106 (not illustrated in FIG. 2) is formed on a bottom substrate or support plate 206. Generally, the electrode layer 204 comprises indium tin oxide (ITO). In some implementations, an optional dielectric barrier layer 205 (similar to insulating layer 110 of FIGS. 1A and 1B) may at least partially separate the electrode layer 204 from a hydrophobic layer 208 also formed on the bottom substrate 206 over the electrode layer 204. In some implementations, the hydrophobic layer 208 can comprise a fluoropolymer, such as, for example, AF1600, produced by DuPont, based in Wilmington, Del. Pixel walls 210 form a patterned electrowetting element grid on the hydrophobic layer 208, as can be seen in FIG. 2. The pixel walls 210 may comprise a photoresist material, such as, for example, epoxy-based negative photoresist SU-8. The patterned electrowetting element grid comprises rows and columns that form an electrowetting element array of field electrowetting elements and border electrowetting elements. For example, an electrowetting element can have a width and length in a range of about 50 to 500 microns. A first fluid 212, which can have a thickness in a range of about 1 to 10 microns, for example, overlies the hydrophobic layer 208. The first fluid 212 is generally an oil and is partitioned by the pixel walls 210 of the patterned electrowetting element grid. An outer rim 214 can comprise the same material as the pixel walls 210. A second fluid 216, such as a fluid that includes an electrolyte and thus is an electroconductive or polar liquid, overlies the oil 212 and the pixel walls 210 of the patterned electrowetting element grid.

A top substrate or support plate 218 covers the second fluid 216 and an adhesive/sealing material 220 serves as a seal and retains the second fluid 216 over the electrowetting element array. The adhesive/sealing material 220 generally comprises ultraviolet (UV) curable epoxy glue, although other types of adhesive/sealing material are acceptable. The bottom substrate 206 and the top substrate 218 may be separate parts of individual electrowetting elements or the bottom substrate 206 and the top substrate 218 may be shared by a plurality of electrowetting elements. The bottom substrate 206 and the top substrate 218 may be made of glass or polymer and may be rigid or flexible, for example.

A voltage V applied across the second fluid 216 and the dielectric barrier layer stack (e.g., the hydrophobic layer 208) of individual electrowetting elements can control transmittance or reflectance of the individual electrowetting elements 202. More particularly, in a number of embodiments, the electrowetting display 200 may be a transmissive, reflective or transflective display that generally includes an array of pixels or sub-pixels (e.g., pixel regions 116 of FIGS. 1A and 1B) configured to be operated by an active matrix addressing scheme. For example, as previously noted, rows and columns of electrowetting pixels are operated by controlling voltage levels on a plurality of source lines and gate lines. In this fashion, the electrowetting display 200 may produce an image by selecting particular pixel regions to at least partly transmit, reflect or block light. Pixel regions are addressed (e.g., selected) via rows and columns of the source lines and gate lines that are electrically connected to transistors (e.g., used as switches) included in each pixel region.

The electrowetting display 200 has a viewing side 222 on which an image for display formed by the electrowetting display 200 can be viewed, and a rear side 224. The top substrate 218 faces viewing side 222 and the bottom substrate 206 faces the rear side 224. The top substrate 218 is coupled to the bottom substrate 206 with the adhesive/sealing material 220. In an alternative embodiment, the electrowetting display 200 may be viewed from the rear side 224. The electrowetting display 200 may be a reflective, transmissive or transreflective type. The electrowetting display 200 may be a segmented display type in which the image is built up of segments. The segments can be switched simultaneously or separately. Each segment includes one electrowetting element 202 or a number of electrowetting elements 202 that may be neighboring or distant from one another. The electrowetting elements 202 included in one segment are switched simultaneously, for example. The electrowetting display 200 may also be an active matrix driven display type or a passive matrix driven display, just to name a few examples.

The second fluid 216 is substantially immiscible with the first fluid 212. Generally, immiscible refers to the inability of the second fluid 216 to mix or blend with the first fluid 212. The second fluid 216 generally includes an electrolyte and is electrically conductive or polar. The second fluid 216 may be water or a salt solution such as a solution of potassium chloride in a mixture of water and ethyl alcohol, for example. The second fluid 216 may comprise at least one component selected from the group consisting of: ethylene glycol; diethyleneglycol; polyethylene glycol; propylene glycol; dioxalane; glyoxal; citric acid; oxalic acid; oxamic acid; and formic acid; and includes a second component which is different from the first component and is selected from the group consisting of: erythritol; ethylene glycol; ethylene carbonate; propylene carbonate; glycerol; and butanetriol.

The second fluid 216 is preferably transparent, but may be colored, white, absorbing or reflecting. The first fluid 212, generally referred to as oil, is electrically non-conductive and may for instance be an alkane like hexadecane or (silicone) oil. The hydrophobic layer 208 is arranged on the bottom substrate 206 to create an electrowetting surface area. The hydrophobic character causes the first fluid 212 to adhere preferentially to the bottom substrate 206 since the first fluid 212 has a higher wettability with respect to the surface of the hydrophobic layer 208 than the hydrophobic layer 208 has with respect to the second fluid 216. Wettability relates to the relative affinity of a fluid for the surface of a solid. Wettability increases with increasing affinity, and it can be measured by the contact angle formed between the fluid and the solid and measured internal to the fluid of interest. For example, such a contact angle can increase from relative non-wettability of more than 90° to complete wettability at 0°, in which case the fluid tends to form a film on the surface of the solid.

The electrode layer 204 is separated from the first fluid 212 and the second fluid 216 by an insulator, which may be the hydrophobic layer 208. The electrode layer 204 (e.g., electrode 106 of FIGS. 1A and 1B) is supplied with voltage signals V by a first signal line. A second signal line is electrically connected to a top electrode (not illustrated in FIG. 2; e.g., electrode 108 of FIGS. 1A-1C) that is in contact with the conductive second fluid 216. This top electrode may be common to more than one electrowetting element 202 since the electrowetting elements 202 are generally fluidly interconnected by and share the second fluid 216 uninterrupted by the pixel walls 210. The electrowetting elements 202 are controlled by the voltage V applied between the first and second signal lines.

The first fluid 212 absorbs at least a part of the optical spectrum. The first fluid 212 may be transmissive for a part of the optical spectrum, forming a color filter. For this purpose, the first fluid 212 may be colored by addition of pigment particles or dye, for example. Alternatively, the first fluid 212 may be black (e.g., absorbing substantially all parts of the optical spectrum) or reflecting. The hydrophobic layer 208 may be transparent or reflective. A reflective layer may reflect the entire visible spectrum, making the layer appear white, or part of it, making it have a color.

When the voltage V applied between the signal lines is set at a non-zero active signal level, the electrowetting element 202 will enter into an active state. Electrostatic forces will move the second fluid 216 toward the electrode layer 204, thereby repelling the first fluid 212 from the area of the hydrophobic layer 208 to the pixel walls 210 surrounding the area of the hydrophobic layer 208, to a droplet-like shape. This action uncovers the first fluid 212 from the surface of the hydrophobic layer 208 of the electrowetting element 202. When the voltage across the electrowetting element 202 is returned to an in-active signal level of zero volts or a value near to zero volts, the electrowetting element 202 will return to an inactive state, where the first fluid 212 flows back to cover the hydrophobic layer 208. In this way, the first fluid 212 forms an electrically controllable optical switch in each electrowetting element 202.

Figure 3:
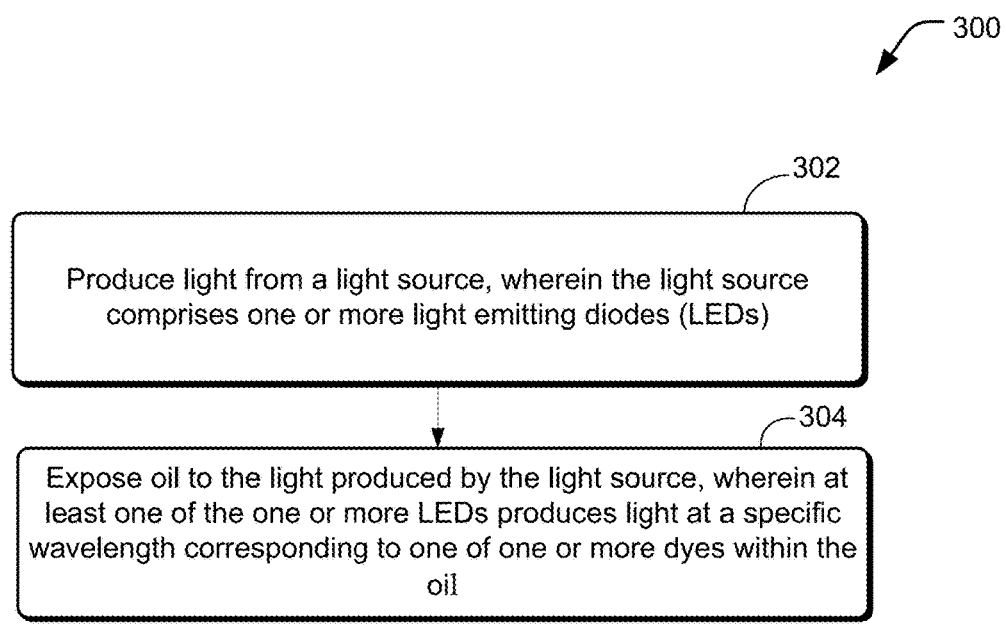
FIG. 3 is a flow diagram illustrating an example method of illuminating the electrowetting display of FIGS. 1A and 1B.

FIG. 3 is a flow diagram illustrating a method 300 of illuminating an electrowetting display comprising an oil that includes one or more dyes, such as, for example, the electrowetting display 100. At 302, light is produced from a light source, wherein the light source comprises one or more light emitting diodes (LEDs). At 304, the oil is exposed to the light produced by the light source, wherein at least one of the one or more LEDs produces light at a specific wavelength corresponding to one of the one or more dyes.

While embodiments of the present disclosure have been described primarily with respect to electrowetting displays, other types of displays can benefit from the present disclosure. For example, LCDs, electrophoretic displays, cholesteric LCDs, organic light emitting diode (OLED) displays, plasma panels, field emission displays, electrofluidic pixel displays, photonic ink displays, and other display technologies can benefit from the present disclosure and thus, the present disclosure is not limited to electrowetting displays.

Figure 4:
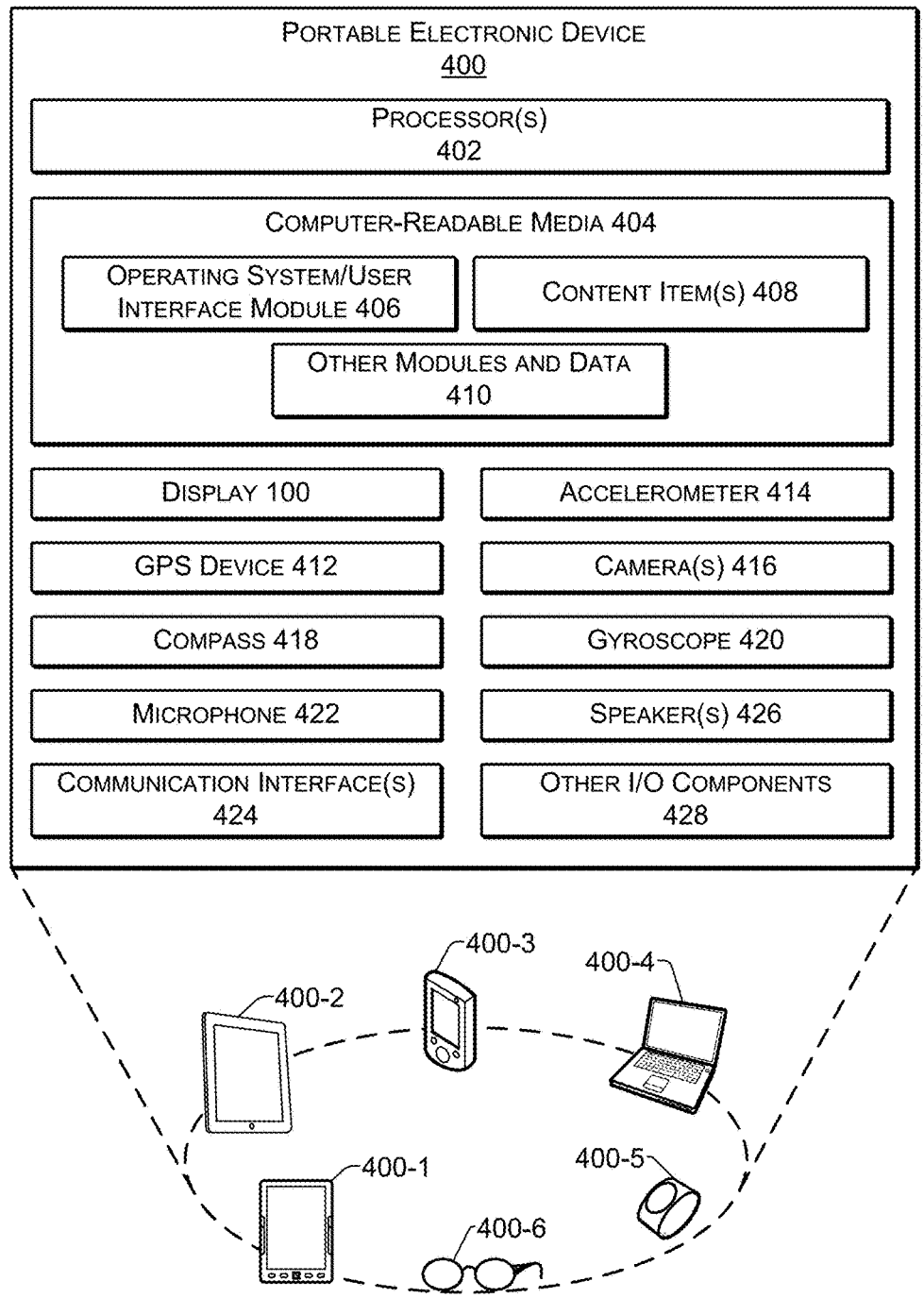
FIG. 4 illustrates select components of an example image display apparatus that may include an electrowetting display according to various embodiments described herein.

FIG. 4 illustrates select example components of an example image display apparatus 400 that may be used with the electrowetting display 100 according to some implementations. Other types of displays may also be used with the example image display apparatus 400. Such types of displays include, but are not limited to, LCDs, cholesteric displays, electrophoretic displays, electrofluidic pixel displays, photonic ink displays, and the like.

The image display apparatus 400 may be implemented as any of a number of different types of electronic devices. Some examples of the image display apparatus 400 may include digital media devices and eBook readers 400-1; tablet computing devices 400-2; smart phones, mobile devices and portable gaming systems 400-3; laptop and netbook computing devices 400-4; wearable computing devices 400-5; augmented reality devices, helmets, goggles or glasses 400-6; and any other device capable of connecting with the electrowetting display 100 and including a processor and memory for controlling the display according to the techniques described herein.

In a very basic configuration, the image display apparatus 400 includes, or accesses, components such as at least one control logic circuit, central processing unit, or processor 402, and one or more computer-readable media 404. Each processor 402 may itself comprise one or more processors or processing cores. For example, the processor 402 can be implemented as one or more microprocessors, microcomputers, microcontrollers, digital signal processors, central processing units, state machines, logic circuitries, and/or any devices that manipulate signals based on operational instructions. In some cases, the processor 402 may be one or more hardware processors and/or logic circuits of any suitable type specifically programmed or configured to execute the algorithms and processes described herein. The processor 402 can be configured to fetch and execute computer-readable instructions stored in the computer-readable media 404 or other computer-readable media. The processor 402 can also perform one or more functions attributed to a graphic controller (not illustrated) for the electrowetting display.

Depending on the configuration of the image display apparatus 400, the computer-readable media 404 may be an example of tangible non-transitory computer storage media and may include volatile and nonvolatile memory and/or removable and non-removable media implemented in any type of technology for storage of information such as computer-readable instructions, data structures, program modules or other data. The computer-readable media 404 may include, but is not limited to, RAM, ROM, EEPROM, flash memory or other computer-readable media technology, CD-ROM, digital versatile disks (DVD) or other optical storage, magnetic cassettes, magnetic tape, solid-state storage and/or magnetic disk storage. Further, in some cases, the image display apparatus 400 may access external storage, such as RAID storage systems, storage arrays, network attached storage, storage area networks, cloud storage, or any other medium that can be used to store information and that can be accessed by the processor 402 directly or through another computing device or network. Accordingly, the computer-readable media 404 may be computer storage media able to store instructions, modules or components that may be executed by the processor 402.

The computer-readable media 404 may be used to store and maintain any number of functional components that are executable by the processor 402. In some implementations, these functional components comprise instructions or programs that are executable by the processor 402 and that, when executed, implement operational logic for performing the actions attributed above to the image display apparatus 400. Functional components of the image display apparatus 400 stored in the computer-readable media 404 may include the operating system and user interface module 406 for controlling and managing various functions of the image display apparatus 400, and for generating one or more user interfaces on the electrowetting display 100 of the image display apparatus 400.

In addition, the computer-readable media 404 may also store data, data structures and the like, that are used by the functional components. For example, data stored by the computer-readable media 404 may include user information and, optionally, one or more content items 408. Depending on the type of the image display apparatus 400, the computer-readable media 404 may also optionally include other functional components and data, such as other modules and data 410, which may include programs, drivers and so forth, and the data used by the functional components. Further, the image display apparatus 400 may include many other logical, programmatic and physical components, of which those described are merely examples that are related to the discussion herein. Further, while the figures illustrate the functional components and data of the image display apparatus 400 as being present on the image display apparatus 400 and executed by the processor 402 on the image display apparatus 400, it is to be appreciated that these components and/or data may be distributed across different computing devices and locations in any manner.

FIG. 4 further illustrates examples of other components that may be included in the image display apparatus 400. Such examples include various types of sensors, which may include a GPS device 412, an accelerometer 414, one or more cameras 416, a compass 418, a gyroscope 420, a microphone 422, and so forth.

The image display apparatus 400 may further include one or more communication interfaces 424, which may support both wired and wireless connection to various networks, such as cellular networks, radio, Wi-Fi networks, close-range wireless connections, near-field connections, infrared signals, local area networks, wide area networks, the Internet, and so forth. The communication interfaces 424 may further allow a user to access storage on or through another device, such as a remote computing device, a network attached storage device, cloud storage, or the like.

The image display apparatus 400 may further be equipped with one or more speakers 426 and various other input/output (I/O) components 428. Such I/O components 428 may include a touchscreen and various user controls (e.g., buttons, a joystick, a keyboard, a keypad, etc.), a haptic or tactile output device, connection ports, physical condition sensors, and so forth. For example, the operating system 406 of the image display apparatus 400 may include suitable drivers configured to accept input from a keypad, keyboard, or other user controls and devices included as the I/O components 428. Additionally, the image display apparatus 400 may include various other components that are not illustrated, examples of which include removable storage, a power source, such as a battery and power control unit, a PC Card component, and so forth.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications can be made, and equivalents can be substituted, without departing from claimed subject matter. Additionally, many modifications can be made to adapt a particular situation to the teachings of claimed subject matter without departing from the central concept described herein. Therefore, it is intended that claimed subject matter not be limited to the particular embodiments disclosed, but that such claimed subject matter can also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter can be practiced without these specific details. In other instances, methods, devices, or systems that would be known by one of ordinary skill have not been described in detail so as not to obscure claimed subject matter.

Reference throughout this specification to "one embodiment" or "an embodiment" can mean that a particular feature, structure, or characteristic described in connection with a particular embodiment can be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described can be combined in various ways in one or more embodiments. In general, of course, these and other issues can vary with the particular context of usage. Therefore, the particular context of the description or the usage of these terms can provide helpful guidance regarding inferences to be drawn for that context.

What is claimed is:

1. An electrowetting display comprising:
   a first substrate and a second substrate opposite to the first substrate;
   a plurality of pixel walls that intersect to separate a plurality of pixel regions, wherein each pixel region comprises:
     a hydrophobic surface on the first substrate;
     an oil on the hydrophobic surface between the first substrate and the second substrate, wherein the oil comprises a mixture of dyes, and wherein the mixture comprises a red dye, a green dye and a blue dye;
     a fluid that includes an electrolyte, wherein the fluid is on the oil; and
     a pixel electrode, wherein when a voltage is applied to the pixel region via the pixel electrode in conjunction with a common electrode, a portion of the oil is displaced by the fluid on the hydrophobic surface; and
   an illumination layer between the first substrate and the second substrate, wherein the illumination layer comprises a red light emitting diode (LED), a green LED and a blue LED, and wherein the red LED produces red light at a wavelength of light absorption that corresponds to a wavelength of the red dye, the green LED produces green light at a wavelength of light absorption that corresponds to a wavelength of the green dye, and the blue LED produces blue light at a wavelength of light absorption that corresponds to a wavelength of the blue dye.

2. The electrowetting display of claim 1, wherein the illumination layer is one of (i) a backlight source or (ii) a frontlight source and further comprises a light guide film.

3. An electrowetting display comprising:
   a first substrate and a second substrate opposite to the first substrate, wherein a plurality of pixel regions is provided between the first substrate and the second substrate;
   a first fluid within the pixel regions and arranged on the first substrate, wherein the first fluid comprises a first dye having a color;
   a second fluid on the first fluid, wherein the second fluid is substantially immiscible with the first fluid;
   an illumination layer between the first substrate and the second substrate, wherein the illumination layer comprises a first wavelength-tuned light source, and wherein substantially all of the light produced by the wavelength-tuned light source is in a wavelength range that corresponds to the color of the first dye.

4. The electrowetting display of claim 3, wherein the first fluid comprises additional dyes, and wherein the first dye and the additional dyes comprise a red dye, a green dye and a blue dye, respectively.

5. The electrowetting display of claim 4, wherein the illumination layer comprises additional wavelength-tuned light sources, and wherein:
   the first wavelength-tuned light source and the additional wavelength-tuned light sources comprise a red light source, a green light source and a blue light source, respectively;
   the red light source produces red light at a wavelength that corresponds to a wavelength of absorption of the red dye;

the green light source produces green light at a wavelength that corresponds to a wavelength of absorption of the green dye; and the blue light source produces blue light at a wavelength that corresponds to a wavelength of absorption of the blue dye.

6. The electrowetting display of claim 3, wherein the first fluid comprises additional dyes and the illumination layer comprises additional wavelength-tuned light sources, and wherein:

the first dye comprises a yellow dye;

the first wavelength-tuned light source and the additional wavelength-tuned light sources comprise a cyan light source, a magenta light source and a yellow light source, respectively; and the yellow light source produces yellow light at a wavelength that corresponds to a wavelength of absorption of the yellow dye.

7. The electrowetting display of claim 3, wherein the first fluid comprises additional dyes and the illumination layer comprises additional wavelength-tuned light sources, and wherein:

the first dye and the additional dyes comprise a cyan dye, a magenta dye and a yellow dye, respectively;

the first wavelength-tuned light source and the additional wavelength-tuned light sources comprise a cyan light source, a magenta light source and a yellow light source, respectively;

the cyan light source produces cyan light at a wavelength that corresponds to a wavelength of absorption of the cyan dye;

the magenta light source produces magenta light at a wavelength that corresponds to a wavelength of absorption of the magenta dye; and the yellow light source produces yellow light at a wavelength that corresponds to a wavelength of absorption of the yellow dye.

8. The electrowetting display of claim 3, wherein the illumination layer comprises a backlight source adjacent to the first substrate.

9. The electrowetting display of claim 8, wherein the illumination layer further comprises a light guide film.

10. The electrowetting display of claim 3, wherein the illumination layer comprises a frontlight source adjacent to the second substrate.

11. The electrowetting display of claim 10, wherein the illumination layer further comprises a light guide film.

12. The electrowetting display of claim 3, wherein the first wavelength-tuned light source comprises a light emitting diode (LED).

13. An electronic device comprising an electrowetting display comprising:

a first substrate and a second substrate opposite to the first substrate, wherein a plurality of pixel regions is provided between the first substrate and the second substrate;

a first fluid within the pixel regions and arranged on the first substrate, wherein the first fluid comprises one or more dyes;

a second fluid on the first fluid, wherein the second fluid is substantially immiscible with the first fluid;

an illumination layer between the first substrate and the second substrate, wherein the illumination layer comprises one or more wavelength-tuned light sources, and wherein substantially all light produced by at least one of the one or more wavelength-tuned light sources produces light in a wavelength range corresponding to a wavelength range of absorption of a dye of the of the one or more dyes.

14. The electronic device of claim 13, wherein the one or more dyes comprise a red dye, a green dye and a blue dye.

15. The electronic device of claim 14, wherein:

the one or more wavelength-tuned light sources comprise a red light source, a green light source and a blue light source;

the red light source produces red light at a wavelength that corresponds to a wavelength of absorption of the red dye;

the green light source produces green light at a wavelength that corresponds to a wavelength of absorption of the green dye; and the blue light source produces blue light at a wavelength that corresponds to a wavelength of absorption of the blue dye.

16. The electronic device of claim 13, wherein:

the one or more dyes comprise a yellow dye;

the one or more wavelength-tuned light sources comprise a cyan light source, a magenta light source and a yellow light source; and the yellow light source produces yellow light at a wavelength that corresponds to a wavelength of absorption of the yellow dye.

17. The electronic device of claim 13, wherein:

the one or more dyes comprise a cyan dye, a magenta dye and a yellow dye;

the one or more wavelength-tuned light sources comprise a cyan light source, a magenta light source and a yellow light source;

the cyan light source produces cyan light at a wavelength that corresponds to a wavelength of absorption of the cyan dye;

the magenta light source produces magenta light at a wavelength that corresponds to a wavelength of absorption of the magenta dye; and the yellow light source produces yellow light at a wavelength that corresponds to a wavelength of absorption of the yellow dye.

18. The electronic device of claim 13, wherein the illumination layer comprises a backlight source adjacent to the first substrate.

19. The electronic device of claim 18, wherein the illumination layer further comprises a light guide film.

20. The electronic device of claim 13, wherein the illumination layer comprises a frontlight source adjacent to the second substrate.

21. The electronic device of claim 20, wherein the illumination layer further comprises a light guide film.

22. The electronic device of claim 13, wherein the one or more wavelength-tuned light sources comprise light emitting diodes (LEDs).

* * * * *